(12) United States Patent
Li et al.

(10) Patent No.: US 11,629,704 B2
(45) Date of Patent: Apr. 18, 2023

(54) BEARING LUBRICATION STRUCTURE FOR A WIND POWER GEARBOX

(71) Applicant: NANJING HIGH-SPEED GEAR MANUFACTURING CO., LTD., Jiangsu (CN)

(72) Inventors: Hongjian Li, Jiangsu (CN); Hechao Zhang, Jiangsu (CN); Xuefeng Wang, Jiangsu (CN)

(73) Assignee: NANJING HIGH-SPEED GEAR MANUFACTURING CO., LTD., Jiangsu (CN)

( * ) Notice: Subject to any disclaimer, the term of this patent is extended or adjusted under 35 U.S.C. 154(b) by 0 days.

(21) Appl. No.: 17/541,481

(22) Filed: Dec. 3, 2021

(65) Prior Publication Data
US 2022/0381228 A1 Dec. 1, 2022

(30) Foreign Application Priority Data
May 31, 2021 (CN) .......................... 202110597903.2

(51) Int. Cl.
*F03D 80/70* (2016.01)
*F03D 15/00* (2016.01)
*F16H 57/04* (2010.01)
*F16H 57/08* (2006.01)

(52) U.S. Cl.
CPC ............. *F03D 80/70* (2016.05); *F03D 15/00* (2016.05); *F16H 57/0471* (2013.01); *F16H 57/082* (2013.01); *F05B 2240/54* (2013.01); *F05B 2260/40311* (2013.01); *F05B 2260/98* (2013.01)

(58) Field of Classification Search
CPC ...... F03D 80/70; F03D 15/00; F16H 57/0471; F16H 57/082; F05B 2240/54; F05B 2260/40311; F05B 2260/98
See application file for complete search history.

(56) References Cited

U.S. PATENT DOCUMENTS 8,597,155 B2 * 12/2013 Noller .................... F03D 80/70
74/606 R

FOREIGN PATENT DOCUMENTS

| CN | 108757905 A | | 11/2018 | |
| CN | 108757906 A | * | 11/2018 | ............. F03D 80/70 |
| CN | 108757906 A | | 11/2018 | |
| CN | 212455458 U | * | 2/2021 | |
| CN | 212455458 U | | 2/2021 | |

OTHER PUBLICATIONS

European Search Report issued by the European Patent Office in connection with International Application No. 21213062.9, dated Jul. 6, 2022.

* cited by examiner

*Primary Examiner* — Jacob M Amick
*Assistant Examiner* — Charles J Brauch
(74) *Attorney, Agent, or Firm* — Carter, DeLuca & Farrell LLP; George Likourezos

(57) ABSTRACT

A bearing lubrication structure for a wind power gearbox includes a housing, a bearing, a planet carrier, and an oil scraper assembly. The planet carrier is rotatably disposed on the housing through the bearing. A first end face of the planet carrier and a second end face of the housing form a receiving chamber. The oil scraper assembly is disposed on the second end face and is located in the receiving chamber. The oil scraper assembly includes an oil scraper member. The oil scraper member is configured to, when the planet carrier rotates, collect oil from the first end face and make the oil flow into the bearing.

18 Claims, 4 Drawing Sheets

BEARING LUBRICATION STRUCTURE FOR A WIND POWER GEARBOX

CROSS-REFERENCE TO RELATED APPLICATION(S)

This application claims priority to Chinese Patent Application No. 202110597903.2 filed May 31, 2021, the disclosure of which is incorporated herein by reference in its entirety.

TECHNICAL FIELD

The present disclosure relates to the field of wind power equipment and, in particular, to a bearing lubrication structure for a wind power gearbox.

BACKGROUND

At present, a wind power gearbox that is operating relies on forced lubrication (that is, a motor pump supplies oil to a bearing) to lubricate the bearing of a planet carrier. To reduce the loss of electric energy when the wind power gearbox is idling, the electric pump does not run. As a result, the bearing cannot be lubricated when the gear in the gearbox rotates or swings.

In view of this situation, existing lubrication structures are mainly divided into two types. In terms of a first type of lubrication structure, an oil collection box and an oil drip pan are disposed on the planet carrier, and when the gear rotates, the oil in an oil chamber can be stirred so that the oil can be poured into the oil collection box and then flow into the bearing through a drainage groove on the oil drip pan. In this manner, the service life of the bearing in the gearbox is prolonged. In terms of a second type of lubrication structure, an oil scraper device to take oil from the end face of a rotating gear member to lubricate the bearing. In terms of the first type of lubrication structure, when the machine is idling, the wind speed affects the rotational speed and direction of the gear and thus affects the amount of oil taken; therefore, the lubrication effect of the bearing cannot be guaranteed. The second type of lubrication structure is applicable to gear transmission with parallel axes. In the case where the second type of lubrication structure is used, during the planet gear transmission of the wind power gearbox, because a gear ring is stationary relative to a lubricating oil surface, a sun gear cannot contact the lubricating oil surface. In addition, the planet gear is orbitally revolving while rotating around its own axis (that is, the rotation axis of the planet gear is uncertain). As a result, it is impossible to scrape oil from the end face of the gear member.

SUMMARY

The object of the present disclosure is to provide a bearing lubrication structure for a wind power gearbox. On the one hand, the bearing lubrication structure for a wind power gearbox takes oil by scraping, and this manner can be applied to gearboxes at various rotational speeds and can also effectively control the capacity of oil taken. On the other hand, because the rotation axis of a planet carrier is fixed, an oil scraper assembly can take oil from the rotating planet carrier. This manner can be applied to various gear structures to ensure the bearing lubrication effect when the gearbox is idling.

To achieve this object, the present disclosure adopts the solutions below.

A bearing lubrication structure for a wind power gearbox includes a housing, the bearing, the planet carrier, and the oil scraper assembly. The planet carrier is rotatably disposed on the housing through the bearing. Moreover, a first end face of the planet carrier and a second end face of the housing form a receiving chamber. The oil scraper assembly is disposed on the second end face and is located in the receiving chamber. The oil scraper assembly includes an oil scraper member. The oil scraper member is configured to, when the planet carrier rotates, collect oil from the first end face and make the oil flow into the bearing.

Figure 1:
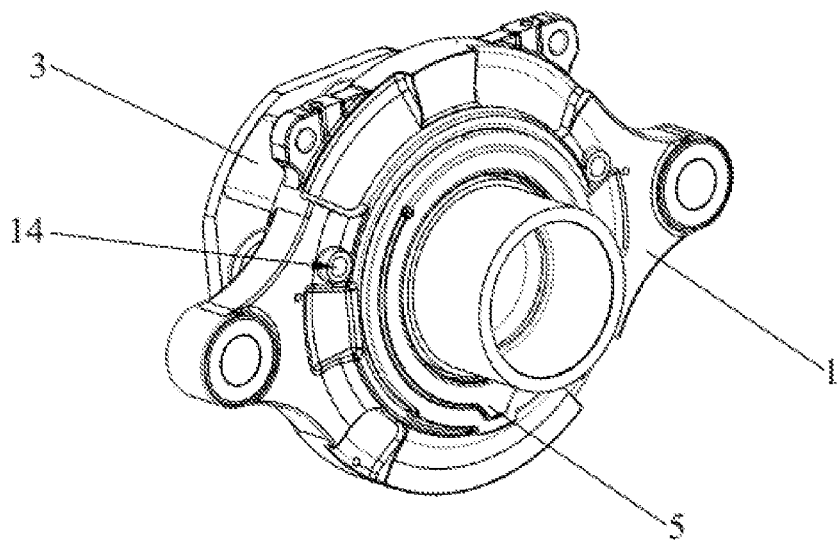
FIG. 1 is a view illustrating the structure of a bearing lubrication structure for a wind power gearbox according to an embodiment of the present disclosure.

REFERENCE LIST 1 housing
11 second end face
12 oil guide hole
13 drainage groove
14 observation through hole
2 bearing
3 planet carrier
31 first end face
4 oil scraper assembly
41 oil scraper member
411 oil scraper part
4111 lip
412 flow guide part
4121 first inclined plane
4122 transition surface
4123 second inclined plane
413 oil discharge part
414 body part
4141 first plane
4142 oil retainer surface
415 oil collection chamber
416 oil retainer part
42 oil collection box
421 open chamber
422 top
423 first side 424 second side
425 open end
426 closed end
5 end cover
6 receiving chamber

DETAILED DESCRIPTION

Embodiments in accordance with the present disclosure are described in detail hereinafter. Examples of the embodiments are illustrated in the drawings, where the same or similar reference numerals indicate the same or similar elements or elements having the same or similar functions. This embodiments described hereinafter with reference to the drawings are merely exemplary. This embodiments described hereinafter with reference to the drawings are intended to explain the present disclosure, and are not to be construed as limiting the present disclosure.

In the description of the present disclosure, it is to be noted that orientations or position relations indicated by terms such as "center", "upper", "lower", "left", "right", "vertical", "horizontal", "in" and "out" are based on the drawings. These orientations or position relations are intended only to facilitate and simplify the description of the present disclosure and not to indicate or imply that a device or element referred to must have such particular orientations or must be configured or operated in such particular orientations. Thus, these orientations or position relations are not to be construed as limiting the present disclosure. Moreover, terms such as "first" and "second" are used only for the purpose of description and are not to be construed as indicating or implying relative importance. The terms "first position" and "second position" are two different positions.

Unless otherwise expressly specified and limited, the term "mounting", "connection", "connected" or "fixed" is to be construed in a broad sense, for example, as fixedly connected, detachably connected, mechanically connected or electrically connected, directly connected to each other or indirectly connected to each other via an intermediary, or internally connected or interactional relationships between two components. For those of ordinary skill in the art, specific meanings of the preceding terms in the present disclosure may be understood based on specific situations.

Unless otherwise expressly specified and limited, when a first feature is described as "above" or "below" a second feature, the first feature and the second feature may be in direct contact or be in contact via another feature between the two features. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

The solutions of the present disclosure are further described hereinafter through specific embodiments in conjunction with the drawings.

Figure 2:
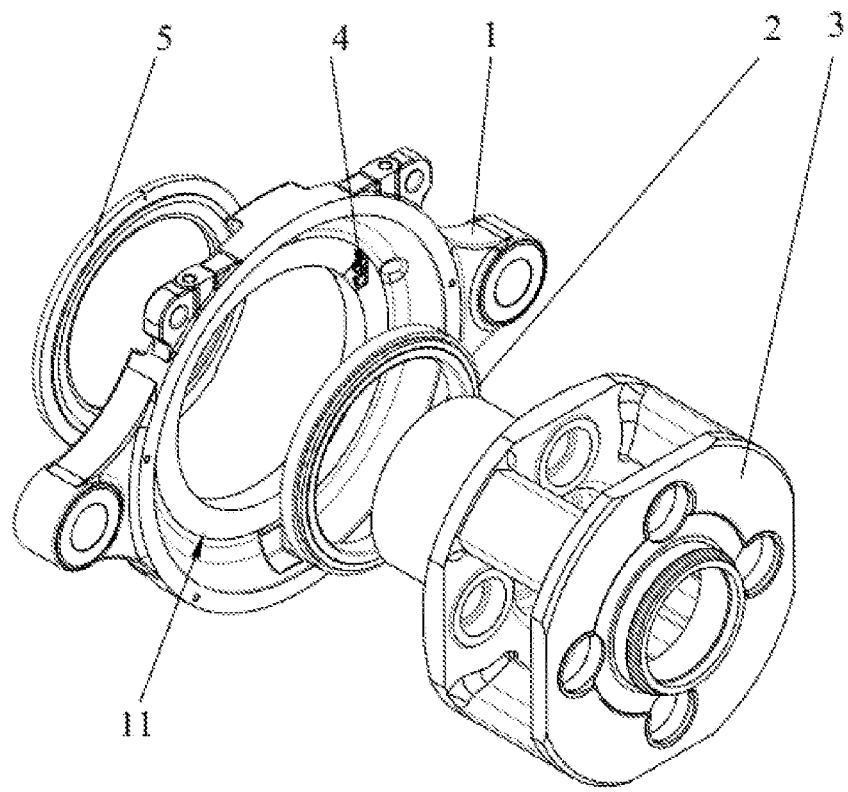
FIG. 2 is a partial exploded view of a bearing lubrication structure for a wind power gearbox according to an embodiment of the present disclosure from a perspective.
Figure 3:
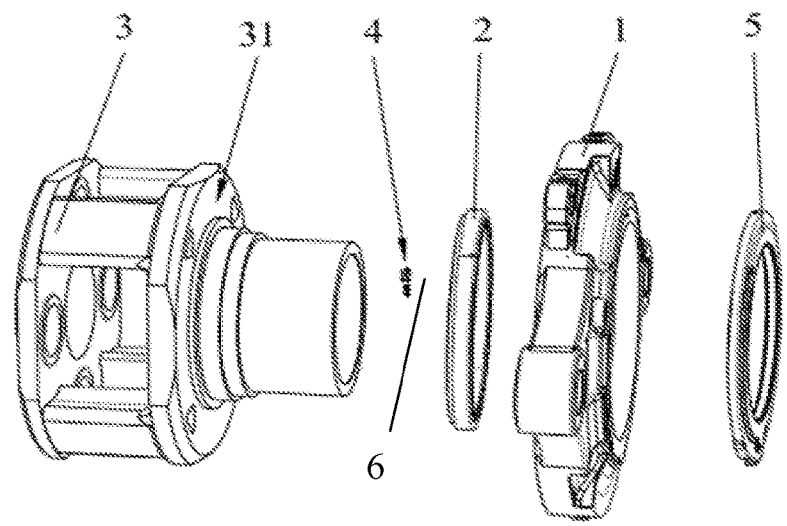
FIG. 3 is an exploded view taken from another perspective to illustrate a bearing lubrication structure for a wind power gearbox according to an embodiment of the present disclosure.

As shown in FIGS. 1 to 3, this embodiment provides a bearing lubrication structure for a wind power gearbox. The lubrication structure includes a housing 1, a bearing 2, a planet carrier 3, an oil scraper assembly 4, and an end cover 5. The planet carrier 3 is rotatably disposed on the housing 1 through the bearing 2. Moreover, the first end face 31 of the planet carrier 3 and the second end face 11 of the housing 1 can form the receiving chamber 6. The oil scraper assembly 4 is disposed on the second end face 11 and is located in the receiving chamber 6. The oil scraper assembly 4 includes an oil scraper member 41. The oil scraper member 41 can, when the planet carrier 3 rotates, collect the oil from the first end face 31 and make the oil flow into the bearing 2. The end cover 5 is connected to the end face of the housing 1 facing away from the second end face 11. The part of the planet carrier 3 extends out of the end cover 5.

When the wind power gearbox is idling, the oil scraper member 41 on the housing 1 can take oil from the first end face 31 of the rotating planet carrier 3 to complete the lubrication of the bearing 2. Compared with the manner of stirring oil to take oil, the present disclosure takes oil by scraping, and this manner can be applied to the gearboxes at various rotational speeds and can also effectively control the amount of oil taken. At the same time, because the rotation axis of the planet carrier 3 is fixed, the oil scraper member 41 can take oil from the rotating planet carrier 3. This manner can be applied to various gear structures to ensure the lubrication effect of the bearing 2 when the gearbox is idling.

In addition, the fit of the end cover 5 with the housing 1 can serve to seal the bearing 2 axially to prevent the oil from leaking outward.

In this embodiment, the second end face 11 protrudes away from the first end face 31 in order to make the overall structure of the wind power gearbox as compact as possible and increase the volume of the receiving chamber 6.

Figure 4:
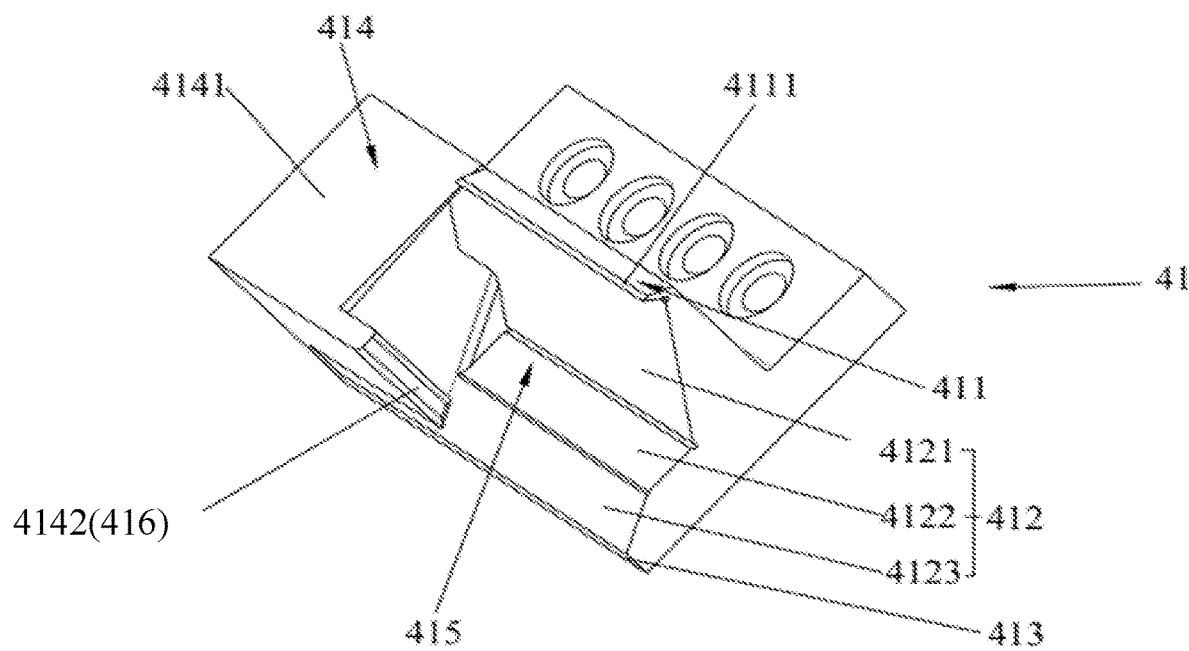
FIG. 4 is a view illustrating the structure of an oil scraper member according to an embodiment of the present disclosure.

As shown in FIG. 4, in this embodiment, the oil scraper member 41 includes a body part 414 and an oil scraper part 411 located on one side of the body part 414. The oil scraper part 411 and the body part 414 form the oil collection chamber 415. The oil scraper part 411 is in contact with the oil attached to the first end face 31. When the planet carrier 3 rotates, the oil on the first end face 31 is scraped by the oil scraper part 411, passes through the oil collection chamber 415 and then lubricates the bearing 2.

The body part 414 includes a first plane 4141 and a flow guide part 412. The first plane 4141 is disposed facing to the planet carrier 3. The flow guide part 412 is located on one side of the first plane 4141 and connected to the oil scraper part 411. The oil scraper part 411 and the flow guide part 412 form the oil collection chamber 415. The oil scraper part 411 protrudes from the first plane 4141 to contact the oil attached to the first end face 31.

In addition, since the oil scraper part 411 protrudes from the plane where the first plane 4141 of the body part 414 is located, it is possible to ensure that the oil attached to the planet carrier 3 can scrape oil through only the oil scraper part 411. Therefore, the capacity of oil scraped is effectively controlled.

It is to be noted that since the oil attached to the first end face 31 of the planet carrier 3 has a certain thickness, the oil scraper member 41 does not need to abut the first end face 31, as long as the oil scraper member 41 can scrape the oil, that is, non-contact oil scraping.

Further, in order to facilitate the flow of the oil from the flow guide part 412 to the bearing 2, the flow guide part 412 includes a first inclined plane 4121, a transition surface 4122, and a second inclined plane 4123, and the first inclined plane 4121, the transition surface 4122, and the second inclined plane 4123 are connected in sequence. The two ends of the first inclined plane 4121 are connected to the oil scraper part 411 and the transition surface 4122 respectively in a manner of arc transition.

Optionally, the oil scraper part 411 includes a lip 4111. When the planet carrier 3 is in the loaded state and in direct contact with the oil scraper part 411 due to the elastic strain, the lip 4111 is connected to the first inclined plane 4121 in a manner of arc transition to generate slight axial deformation to reduce the abrasion on the oil scraper member 4121 caused by direct contact and the scrape on the first end face 31 of the planet carrier 3 caused by direct contact.

The side of the lip 4111 facing away from the flow guide part 412 is an oil scraper surface. The oil scraper surface may be an inclined plane to minimize the contact area between the lip 4111 and the planet carrier 3 when the wind power gearbox is deformed in the loaded state, that is, the lip 4111 actually has only one oil scraper edge for oil scraping when the oil scraper surface is inclined.

Optionally, since the oil scraper surface may be in direct contact the first end face 31 of the planet carrier 3 due to the elastic strain during both the forward rotation and the reverse rotation of the planet carrier 3, the oil scraper part 411 may be disposed with two lips 4111 symmetrically disposed on the one side of the body part 414 where the oil scraper part 411 is disposed, that is, there is a certain included angle between the two lips 4111. Therefore, the abrasion on the oil scraper member 4121 caused by direct contact and the scrape on the first end face 31 of the planet carrier 3 caused by direct contact can be reduced whether during the forward rotation of the planet carrier 3 or during the reverse rotation of the planet carrier 3. Of course, in other embodiments, if processing costs are not considered, at least two mirror symmetrical oil scraper assemblies 4 may be directly configured to meet the oil scraping requirements during the forward rotation of the planet carrier 3 and during the reverse rotation of the planet carrier 3. This is not limited in this embodiment.

Further, the body part 414 extends towards the oil collection chamber 415 to form the oil retainer part 416. The oil retainer part 416 is disposed at one end of the first plane 4141 facing away from the oil scraper part 411. The oil retainer part 416 includes an oil retainer surface 4142. Moreover, the oil retainer surface 4142 is perpendicular to the first plane 414. That is, the scraped oil can flow from the first plane 4141 along the oil retainer surface 4142 into the second inclined plane 4123 and then flow to the bearing 2, so as to prevent excessive oil from flowing into the bearing 2 at one time and thereby from affecting the lubrication effect of the bearing 2.

In addition, since the body part 414 extends towards the oil collection chamber 415 to form the oil retainer part 416, the first plane 4141 is L-shaped. Thus, the drainage surface configured to guide the oil from the first plane 4141 to the oil retainer surface 4142 is further increased. Moreover, the oil flow rate on different drainage surfaces is also different due to the different area of each oil drainage surface. As a result, the control of the overall oil flow is improved. Of course, in other embodiments, if factors such as convenient processing are not considered, other angles other than right angles may be formed between the oil retainer part 416 and the body part 414 without the oil retainer part 416. This is not limited in this embodiment.

Figure 5:
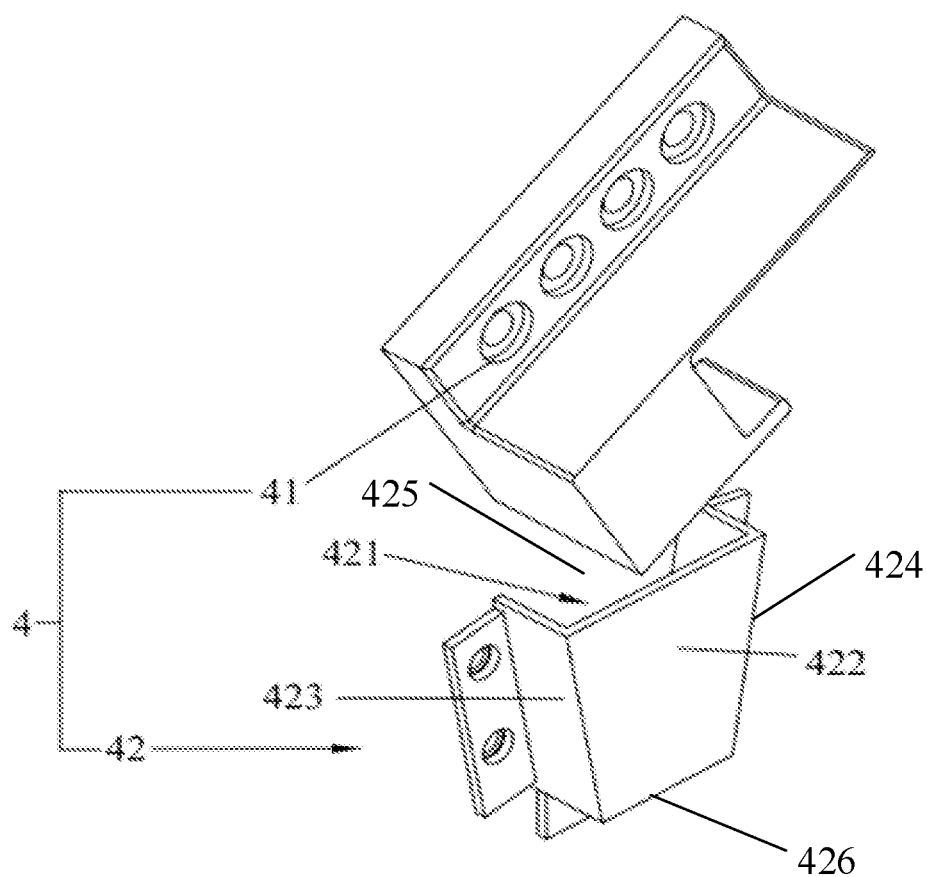
FIG. 5 is a view illustrating the structure of an oil scraper assembly according to an embodiment of the present disclosure.
Figure 6:
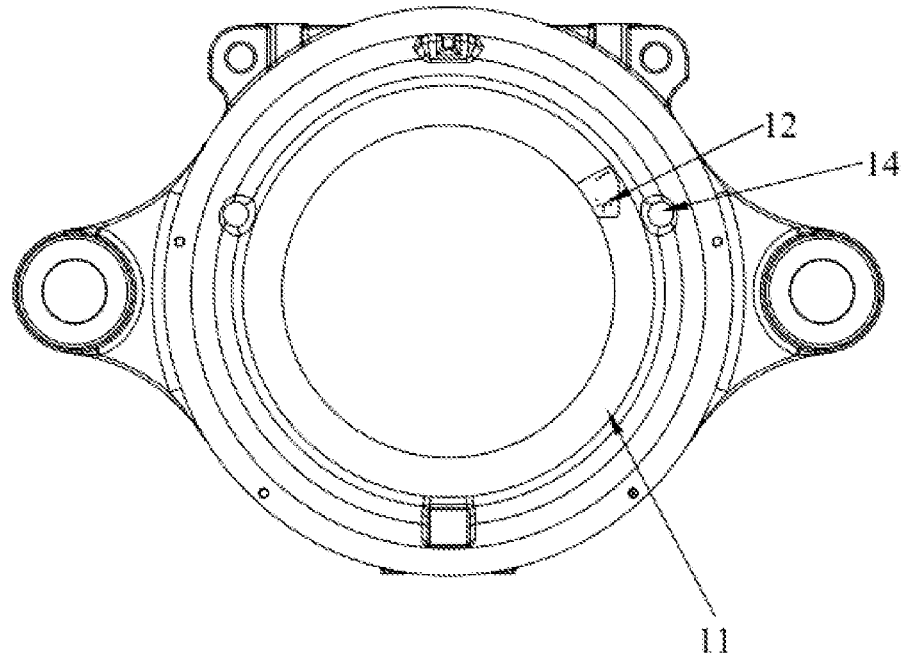
FIG. 6 is a view illustrating the structure of a second end face of a housing according to an embodiment of the present disclosure.

Further, as shown in FIGS. 5 and 6, the oil scraper assembly 4 further includes an oil collection box 42 disposed on the second end face 11. The open chamber 421 is disposed on the oil collection box. The oil guide hole 12 located in the open chamber 421 is disposed in the housing 1. The body part 414 further includes an oil discharge part 413 configured to guide the oil in the oil collection chamber 415 to the open chamber 421. That is, the oil is scraped out by the oil scraper member 41, passes through the oil collection chamber 415, flows into the open chamber 421 through the oil discharge part 413, and finally flows into the bearing 2 through the oil guide hole 12. In this embodiment, the oil scraper member 41 and the oil collection box 42 are disposed on the housing 1 through fasteners in a detachable manner. In other embodiments, the oil scraper member 41 and the oil collection box 42 may also be disposed on the housing 1 in other manners. This is not limited in this embodiment.

In this embodiment, the oil discharge part 413 is connected to the flow guide part 412.

For example, the oil discharge part 413 is disposed at one end of the second inclined plane 4123 facing away from the transition plane 4122. Both the first inclined plane 4121 and the second inclined plane 4123 are inclined towards the oil discharge part 413.

For example, the oil guide hole 12 penetrates the housing 1 in the axial direction of the bearing 2. One end of the oil guide hole 12 is disposed in the open chamber 421.

For example, the fastener is a screw or a bolt.

In addition, it is possible to take oil simply with the arrangement in which the oil scraper member 41 and the oil collection box 42 are added. In this manner, not only many components are reduced compared with the related art, but also the requirements for internal processing accuracy of the wind power gearbox are reduced.

In other embodiments, if oil collection efficiency is not considered, the oil scraper assembly 4 does not need to use the oil collection box 42, that is, the oil scraper assembly 4 includes only an oil scraper member 41. Moreover, a drainage hole connected to the oil guide hole 12 is disposed on the oil scraper member 41 to realize that the oil is scraped out by the oil scraper member 41, flows into the open chamber 421 along the oil discharge hole, and flows into the bearing 2 through the oil guide hole 12. Of course, if there are other structures that can guide the oil scraped by the oil scraper member 41 to the bearing 2 for lubrication, these structures can also be used. This is not limited in this embodiment.

Figure 7:
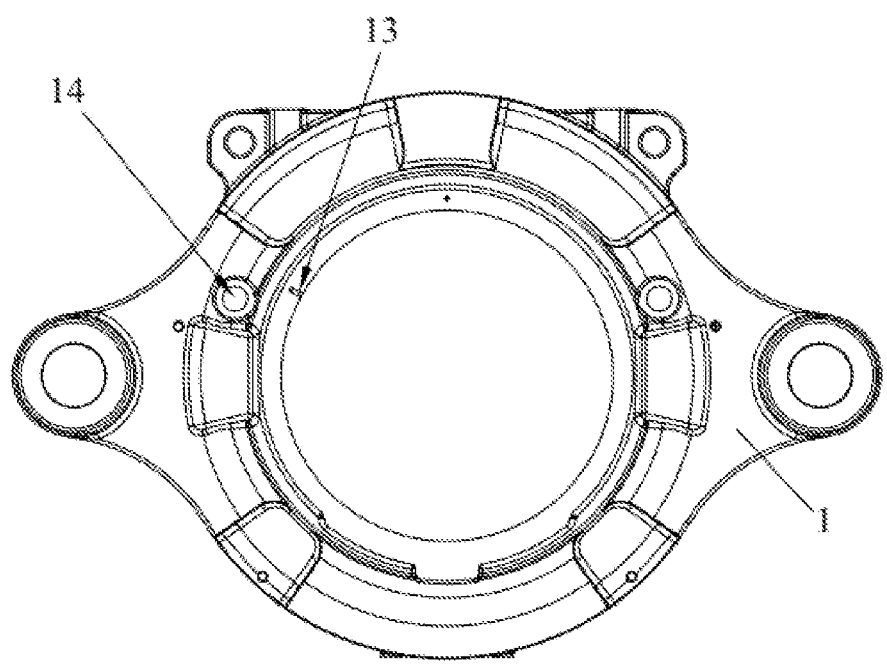
FIG. 7 is a view illustrating the structure of a housing facing away from a second end face according to an embodiment of the present disclosure.

In this embodiment, as shown in FIG. 7, in order to enable the oil to flow from the oil guide hole 12 into the bearing 2, the drainage groove 13 in the radial direction of the bearing 2 is disposed on at least one of following: the end face of the housing 1 facing away from the second end face 11 and the end face of the end cover 5 facing the housing 1. The drainage groove 13 communicates with one end of the oil guide hole 12 facing away from the open chamber 421. In this manner, the oil can flow through the drainage groove 13 into the bearing 2 from the oil guide hole 12. In this embodiment, the drainage groove 13 in the radial direction of the bearing 2 is disposed on the end face of the housing 1 facing away from the second end face 11 and the end face of the end cover 5 facing the housing 1. Therefore, the lubrication effect of the bearing 2 is improved. Of course, in other embodiments, in consideration of reducing the processing steps, it is also possible that the drainage groove 13 in the radial direction of the bearing 2 is disposed on only the end face of the housing 1 facing away from the second end face 11 or the end face of the end cover 5 facing the housing 1. This is not limited in this embodiment.

The oil collection box 42 includes an open end 425 and a closed end 426 disposed opposite to each other, a top 422, and a first side 423 and a second side 424. The first side 423 and the second side 424 located on the two sides of the top 422 respectively and disposed opposite to each other. The top 422, the first side 423, and the second side 424 are connected to form the open chamber 421 configured to collect the oil. One end of the open chamber 421 adjacent to the oil scraper member 41 is the open end 425. One end of the open chamber 421 facing away from the oil scraper member 41 is disposed opposite to the open end 425 is the closed end 426. The oil can enter from the open end 425 and deposit at the closed end 426. At least one oil guide hole 12 is distributed in the open chamber 421.

Further, in order to facilitate the rapid flow of the oil from the oil collection box 42 into the oil guide hole 12, the distance between the first side 423 and the second side 424 gradually reduces in the direction from the open end 425 toward the closed end 426.

For example, a plurality of oil guide holes 12 are distributed in the open chamber 421 to improve the rate of oil that enters the bearing 2.

Further, the observation through hole 14 is disposed on the end face of the housing facing away from the second end face and configured to determine the axial distance between the oil scraper assembly 4 and the first end face 31. Therefore, it is ensured that the oil scraper part 411 can scrape the oil on the planet carrier 3 and does not contact the planet carrier 3, that is, non-contact lubrication. In this embodiment, the specific position of the observation through hole 14 on the end face of the housing 1 facing away from the second end face 11 is not specifically limited, as long as the axial clearance between the oil scraper assembly 4 and the first end face 31 can be seen through the observation through hole 14.

Optionally, in order to improve the lubrication efficiency of the bearing 2, a plurality of oil scraper assemblies 4 are disposed. A plurality of oil scraper assemblies 4 are disposed on the second end face 11 in a circumferentially spaced manner. Of course, a plurality of oil guide holes 12 and drainage grooves 13 matched with the oil scraper assembly 4 are correspondingly disposed. The number of the observation through hole 14 is not specifically limited in this embodiment. It is also feasible if the axial distances between a plurality of oil scraper assemblies 4 and the first end face 31 can be observed simply through one observation through hole 14.

The process of the bearing lubrication structure for a wind power gearbox is described below. The planet carrier 3 rotates relative to the housing 1 through the bearing 2. The lip 4111 of the oil scraper part 411 of the oil scraper member 41 on the second end face 11 scrapes the oil from the first end face 31 of the planet carrier 3. The oil flows from the oil discharge part 413 through the flow guide part 412 into the open chamber 421 of the oil collection box 42 and deposits at the closed end 426. Then the oil flows through the drainage groove 13 out of the oil guide hole 12 and flows into the bearing 2 to complete the lubrication of the bearing 2.

The preceding are only preferred embodiments of the present disclosure. For those of ordinary skill in the art, according to the idea of the present disclosure, there are changes in specific implementations and application scopes, and the content of this specification should not be construed as limitations to the present disclosure.

What is claimed is:

1. A bearing lubrication structure for a wind power gearbox, comprising a housing, a bearing, a planet carrier, and an oil scraper assembly, wherein the planet carrier is rotatably disposed on the housing through the bearing, a first end face of the planet carrier and a second end face of the housing form a receiving chamber, the oil scraper assembly is disposed on the second end face and is located in the receiving chamber, the oil scraper assembly comprises an oil scraper member, the oil scraper member is configured to, when the planet carrier rotates, collect oil from the first end face and make the oil flow into the bearing;

wherein the oil scraper member comprises a body part and an oil scraper part located on one side of the body part, wherein the oil scraper part and the body part form an oil collection chamber, the oil scraper part is configured to contact oil attached to the first end face, and the oil scraper part is further configured to, when the planet carrier rotates, scrape the oil on the first end face so that the oil on the first end face passes through the oil collection chamber and then lubricates the bearing;

wherein the body part comprises a first plane disposed facing to the planet carrier, and the oil scraper part protrudes from the first plane to contact the oil attached to the first end face;

wherein the body part further comprises a flow guide part, the flow guide part is located on one side of the first plane and connected to the oil scraper part, and the oil scraper part and the flow guide part form the oil collection chamber.

2. The bearing lubrication structure for a wind power gearbox according to claim 1, further comprising an end cover, wherein the end cover is connected to an end face of the housing facing away from the second end face, and a part of the planet carrier extends out of the end cover.

3. The bearing lubrication structure for a wind power gearbox according to claim 1, wherein the flow guide part comprises a first inclined plane, a transition surface, and a second inclined plane, wherein the first inclined plane, the transition surface, and the second inclined plane are connected in sequence, and two ends of the first inclined plane are connected to the oil scraper part and the transition surface respectively in a manner of arc transition.

4. The bearing lubrication structure for a wind power gearbox according to claim 3, wherein the oil scraper part comprises a lip, wherein when the planet carrier is in a loaded state and in direct contact with the oil scraper part due to elastic strain, the lip is connected to the first inclined plane in the manner of arc transition to generate an axial deformation.

5. The bearing lubrication structure for a wind power gearbox according to claim 4, wherein two lips are symmetrically provided on one side of body part with the oil scraper part, and a certain angle exists between the two lips.

6. The bearing lubrication structure for a wind power gearbox according to claim 1, wherein the body part extends towards the oil collection chamber to form an oil retainer part, the oil retainer part is disposed at one end of the first plane facing away from the oil scraper part, the oil retainer part comprises an oil retainer surface, and the oil retainer surface is perpendicular to the first plane.

7. The bearing lubrication structure for a wind power gearbox according to claim 1, wherein the oil scraper assembly further comprises an oil collection box disposed on the second end face, wherein an open chamber is disposed on the oil collection box, and an oil guide hole located in the open chamber is disposed in the housing.

8. The bearing lubrication structure for a wind power gearbox according to claim 7, wherein the body part further comprises an oil discharge part configured to guide oil in the oil collection chamber to the open chamber, and the oil guide hole is configured to allow the oil in the open chamber flowing from the oil collection chamber through the oil discharge part to flow into the bearing through the oil guide hole.

9. The bearing lubrication structure for a wind power gearbox according to claim 8, wherein a drainage groove in a radial direction of the bearing is disposed on the end face of the housing facing away from the second end face, the drainage groove is in communication with one end of the oil guide hole facing away from the open chamber, and the drainage groove is configured to allow the oil to flow through the drainage groove into the bearing from the oil guide hole.

10. The bearing lubrication structure for a wind power gearbox according to claim 8, wherein the oil collection box comprises:
an open end and a closed end disposed opposite to each other, wherein the open end is configured to allow the oil to enter the open chamber from the open end, and the closed end is configured to allow the oil in the open chamber to deposit at the closed end;
a top; and
a first side and a second side located on two sides of the top respectively and disposed opposite to each other, wherein the top, the first side, and the second side are connected to form the open chamber configured to collect the oil, one end of the open chamber adjacent to the oil scraper member is the open end, one end of the open chamber facing away from the oil scraper member and disposed opposite to the open end is the closed end, a distance between the first side and the second side gradually reduces in a direction from the open end toward the closed end, and at least one oil guide hole is distributed in the open chamber.

11. The bearing lubrication structure for a wind power gearbox according to claim 1, wherein an observation through hole is disposed on the end face of the housing facing away from the second end face and configured to determine an axial distance between the oil scraper assembly and the first end face.

12. The bearing lubrication structure for a wind power gearbox according to claim 1, wherein a plurality of oil scraper assemblies are disposed on the second end face in a circumferentially spaced manner.

13. A bearing lubrication structure for a wind power gearbox, comprising a housing, a bearing, a planet carrier, and an oil scraper assembly, wherein the planet carrier is rotatably disposed on the housing through the bearing, a first end face of the planet carrier and a second end face of the housing form a receiving chamber, the oil scraper assembly is disposed on the second end face and is located in the receiving chamber, the oil scraper assembly comprises an oil scraper member, the oil scraper member is configured to, when the planet carrier rotates, collect oil from the first end face and make the oil flow into the bearing;
wherein the oil scraper member comprises a body part and an oil scraper part located on one side of the body part, wherein the oil scraper part and the body part form an oil collection chamber, the oil scraper part is configured to contact oil attached to the first end face, and the oil scraper part is further configured to, when the planet carrier rotates, scrape the oil on the first end face so that the oil on the first end face passes through the oil collection chamber and then lubricates the bearing; and
wherein the oil scraper assembly further comprises an oil collection box disposed on the second end face, wherein an open chamber is disposed on the oil collection box, and an oil guide hole located in the open chamber is disposed in the housing.

14. The bearing lubrication structure for a wind power gearbox according to claim 13, wherein the body part further comprises an oil discharge part configured to guide oil in the oil collection chamber to the open chamber, and the oil guide hole is configured to allow the oil in the open chamber flowing from the oil collection chamber through the oil discharge part to flow into the bearing through the oil guide hole.

15. The bearing lubrication structure for a wind power gearbox according to claim 14, wherein a drainage groove in a radial direction of the bearing is disposed on the end face of the housing facing away from the second end face, the drainage groove is in communication with one end of the oil guide hole facing away from the open chamber, and the drainage groove is configured to allow the oil to flow through the drainage groove into the bearing from the oil guide hole.

16. The bearing lubrication structure for a wind power gearbox according to claim 14, wherein the oil collection box comprises:
an open end and a closed end disposed opposite to each other, wherein the open end is configured to allow the oil to enter the open chamber from the open end, and the closed end is configured to allow the oil in the open chamber to deposit at the closed end;
a top; and
a first side and a second side located on two sides of the top respectively and disposed opposite to each other, wherein the top, the first side, and the second side are connected to form the open chamber configured to collect the oil, one end of the open chamber adjacent to the oil scraper member is the open end, one end of the open chamber facing away from the oil scraper member and disposed opposite to the open end is the closed end, a distance between the first side and the second side gradually reduces in a direction from the open end toward the closed end, and at least one oil guide hole is distributed in the open chamber.

17. The bearing lubrication structure for a wind power gearbox according to claim 13, wherein an observation through hole is disposed on the end face of the housing facing away from the second end face and configured to determine an axial distance between the oil scraper assembly and the first end face.

18. The bearing lubrication structure for a wind power gearbox according to claim 13, wherein a plurality of oil scraper assemblies are disposed on the second end face in a circumferentially spaced manner.

* * * * *